United States Patent
Micks et al.

(10) Patent No.: US 10,296,816 B2
(45) Date of Patent: May 21, 2019

(54) GENERATING TRAINING DATA FOR AUTOMATIC VEHICLE LEAK DETECTION

(71) Applicant: Ford Global Technologies, LLC, Dearborn, MI (US)

(72) Inventors: Ashley Elizabeth Micks, Mountain View, CA (US); Jinesh J Jain, Palo Alto, CA (US); Harpreetsingh Banvait, Sunnyvale, CA (US); Bruno Sielly Jales Costa, Sunnyvale, CA (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 186 days.

(21) Appl. No.: 15/404,031

(22) Filed: Jan. 11, 2017

(65) Prior Publication Data

US 2018/0197048 A1    Jul. 12, 2018

(51) Int. Cl.
| | |
|---|---|
| *G06K 9/66* | (2006.01) |
| *G06N 3/08* | (2006.01) |
| *G06K 9/00* | (2006.01) |
| *G06K 9/62* | (2006.01) |

(Continued)

(52) U.S. Cl.
CPC ............... *G06K 9/66* (2013.01); *B60R 1/00* (2013.01); *G06K 9/00214* (2013.01);
(Continued)

(58) Field of Classification Search
CPC .. G06K 9/628; G06K 9/00791; G06K 9/4652; G06K 9/4661; G06K 9/6256;
(Continued)

(56) References Cited

U.S. PATENT DOCUMENTS

| | | | |
|---|---|---|---|
| 5,974,860 A | 11/1999 | Kuroda et al. | |
| 8,228,381 B2 | 7/2012 | Accurso | |

(Continued)

FOREIGN PATENT DOCUMENTS

| | | |
|---|---|---|
| CN | 105182537 A | 12/2015 |
| DE | 102011088167 A1 | 6/2013 |
| EP | 2908203 | 8/2015 |

OTHER PUBLICATIONS

Geraldo L. B. Ramalho, Improving reliability of oil spill detection systems using boosting for high-level feature selection, ACM Digital Library, 2007.

(Continued)

*Primary Examiner* — Daniel G Mariam
(74) *Attorney, Agent, or Firm* — David R. Stevens; Stevens Law Group (57) ABSTRACT

A vehicle controller receives images from a camera upon arrival and upon departure. A location of the vehicle may be tracked and images captured by the camera may be tagged with a location. A departure image may be compared to an arrival image captured closest to the same location as the arrival image. A residual image based on a difference between the arrival and departure images is evaluated for anomalies. Attributes of the anomaly such as texture, color, and the like are determined and the anomaly is classified based on the attributes. If the classification indicates an automotive fluid, then an alert is generated. A machine learning algorithm for generating classifications from image data may be trained using arrival and departure images obtained by rendering of a three-dimensional model or by adding simulated fluid leaks to two-dimensional images.

18 Claims, 9 Drawing Sheets

(51) Int. Cl.
*G06T 11/60* (2006.01)
*G06K 9/46* (2006.01)
*B60R 1/00* (2006.01)
*H04N 13/275* (2018.01)
*G06T 7/00* (2017.01)

(52) U.S. Cl.
CPC ..... *G06K 9/00791* (2013.01); *G06K 9/00812* (2013.01); *G06K 9/4661* (2013.01); *G06K 9/628* (2013.01); *G06K 9/6256* (2013.01); *G06N 3/08* (2013.01); *G06T 7/001* (2013.01); *G06T 11/60* (2013.01); *H04N 13/275* (2018.05); *B60R 2300/80* (2013.01); *G06K 9/4652* (2013.01); *G06T 2207/20081* (2013.01); *G06T 2207/30264* (2013.01)

(58) Field of Classification Search
CPC .. G06K 9/66; G06T 7/40; G06T 11/60; G06T 2207/20081; G06T 2207/10004; G06T 2207/30252; G06T 2210/24; G06T 2219/20; G06T 7/90; H04N 13/275
USPC ........................................................ 382/154
See application file for complete search history.

(56) References Cited

U.S. PATENT DOCUMENTS

| | | | |
|---|---|---|---|
| 8,605,947 | B2 | 12/2013 | Zhang |
| 8,855,849 | B1* | 10/2014 | Ferguson ................. G05D 1/00 |
| | | | 701/28 |
| 9,026,303 | B1 | 5/2015 | Ferguson et al. |
| 2009/0276141 | A1 | 11/2009 | Surnilla et al. |
| 2013/0128048 | A1 | 5/2013 | Okajima |
| 2014/0347485 | A1 | 11/2014 | Zhang |
| 2015/0198455 | A1 | 7/2015 | Chen |
| 2015/0211928 | A1 | 7/2015 | Itoh |
| 2015/0332099 | A1 | 11/2015 | Kosubek |
| 2016/0101734 | A1 | 4/2016 | Baek |
| 2016/0275699 | A1 | 9/2016 | Lu et al. |
| 2017/0355081 | A1* | 12/2017 | Fisher ................... B25J 9/1697 |
| 2017/0364756 | A1 | 12/2017 | Liebau |
| 2018/0149551 | A1* | 5/2018 | Okajima ............... G01M 3/025 |

OTHER PUBLICATIONS

Surveillance System, Leiten, 2014.

* cited by examiner

GENERATING TRAINING DATA FOR AUTOMATIC VEHICLE LEAK DETECTION

BACKGROUND

Field of the Invention

This invention relates to the automated detection of vehicle malfunctions.

Background of the Invention

A fluid leak from under the car might often indicate a dangerous situation that requires attention. Prompt detection of the problem can save the car owner up to thousands of dollars in mechanic's services. Vehicle sensors may detect a malfunction due to a fluid leak, but extensive damage may already have occurred.

The apparatus and methods disclosed herein provide an improved approach for detecting a fluid leak form an automobile.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
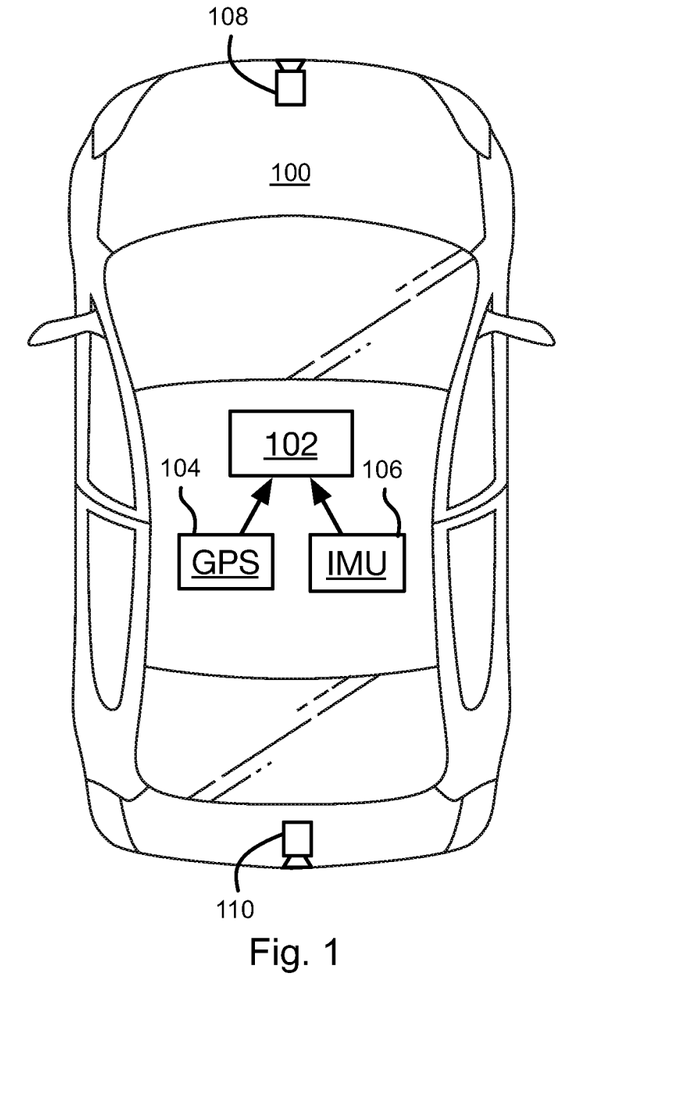
FIG. 1 is a schematic block diagram illustrating a vehicle for which leak detection may be performed in accordance with an embodiment of the present invention.

Referring to FIG. 1, a vehicle 100 may include a controller 102 and one or both of a GPS receiver 104 and an inertial measurement unit (IMU) 106. The controller 102 may use outputs of one or both of the GPS receiver 104 and IMU 106 to determine a position of the vehicle 100. For example, GPS coordinates may be received from the GPS receiver 104 and smaller movements of the vehicle 100 relative to that coordinate may be determined from the IMU 106. In particular, the IMU 106 may be an accelerometer-based device that detects acceleration and resolves it into one or both of velocity and distance measurements.

The vehicle 100 may include one or both of a forward facing camera 108 and a rearward facing camera 110. The methods disclosed herein include evaluating images of a parking spot. Inasmuch as most people drive forwardly into a parking spot, a forward facing camera 108 may be preferred. However, for instances where a driver backs into a parking spot, a rearward facing camera 110 may be helpful. For purposes of the following disclosure, forward parking is assumed and only the forward camera 108 is used. However, the methods described herein may be used for rearward parking using the camera 110 in the same manner.

Figure 2:
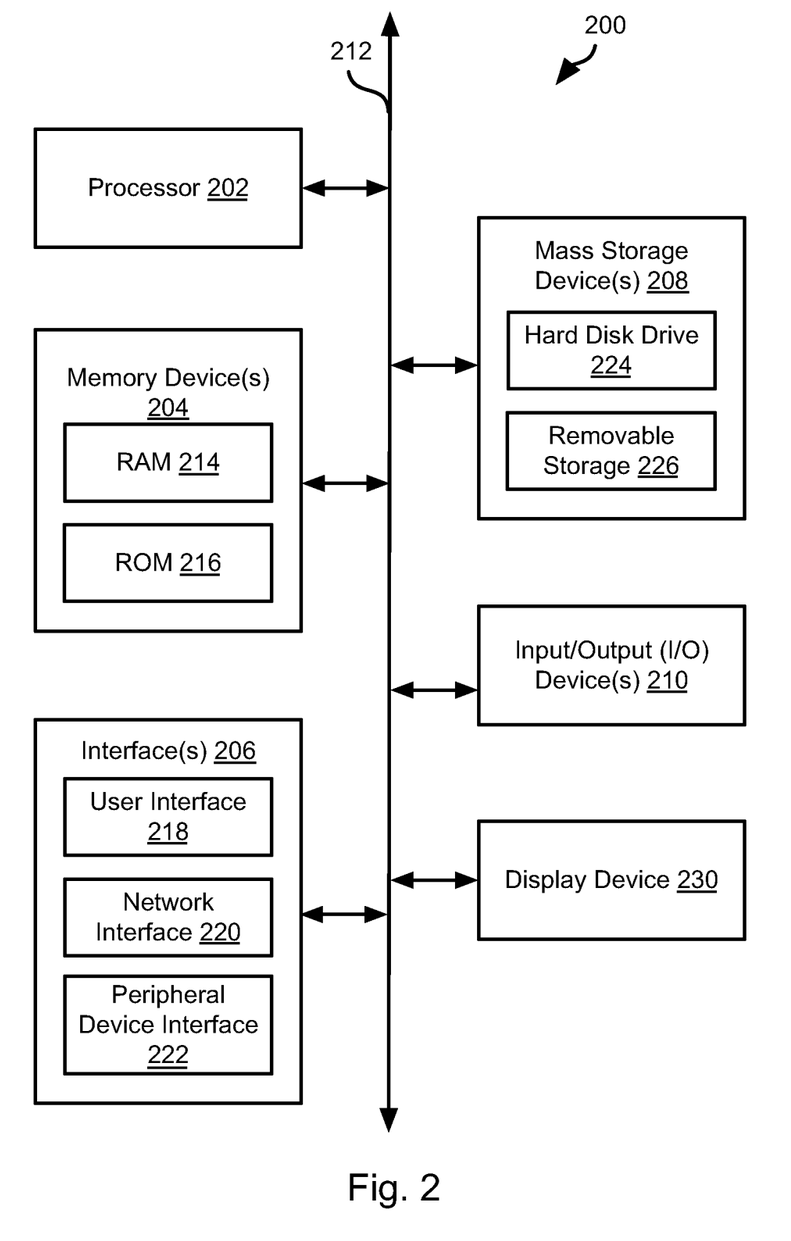
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
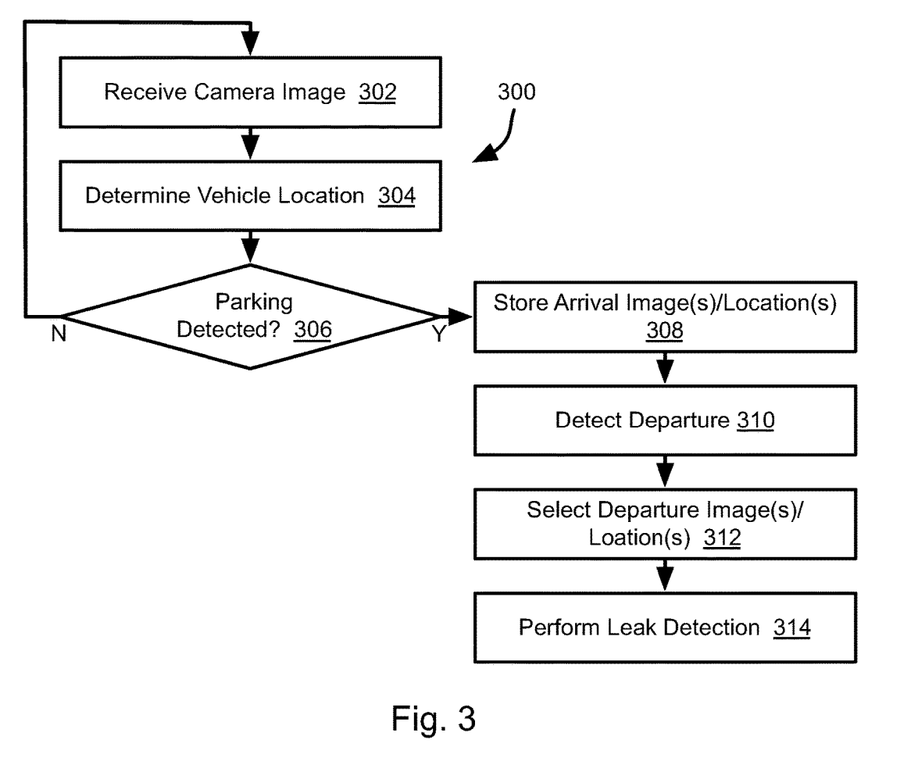
FIG. 3 is a process flow diagram of a method for identifying arrival and departure images in accordance with an embodiment of the present invention.

FIG. 3 illustrates a method 300 that may be executed by the controller 102. In particular, in order to identify leaks, images received from the camera 108 upon arrival at a parking spot may be compared to images received from the camera 108 upon departure from the parking spot in order to identify changes that may indicate leaked fluid.

For example, the method 300 may include receiving 302 one or more camera images 108. For example, the camera 108 may output a stream of images in the form of a video feed or a series of still images at a given frame rate.

The method 300 may further include determining 304 the location of the vehicle 100. This may include receiving outputs of one or both of the GPS receiver 104 and the IMU 106. The manner in which the location of the vehicle 100 is determined from these outputs may be according to any method for determining location known in the art. For example, a GPS coordinate may be received at a point in time. Movements of the vehicle relative to that coordinate may then be determined based on outputs of the IMU 106.

The images of step 302 may be tagged with the locations of step 304 and temporarily stored in a buffer. Alternatively, an array of images may be stored and an array of locations corresponding to each image may be stored in a separate array.

The method 300 may include determining 306 whether parking was detected. Parking may be detected by detecting cessation of movement of the vehicle 100 for an above-threshold amount of time (e.g. 1 minute or more), removal of the key from the vehicle, exiting of the driver from the vehicle, or arrival at a known parking spot such as the driver's home, place of work, store, or other frequent location. A driver may program the controller 102 to recognize certain locations as parking spots.

In response to detecting 306 parking, the method 300 may include storing 308 one or more arrival images and their corresponding locations from among the images and locations of steps 302, 304. For example, images and locations from step 302, 304 may be temporarily stored such that only the last M images and locations are retained. Upon detecting 306 parking, the arrival images may be selected from these temporarily stored images and corresponding locations. Alternatively, steps 302-304 may be performed upon detecting arrival within some proximity of a known parking spot or upon the vehicle slowing to below some threshold speed that indicates potential parking.

For example, a set of the one or more images and their corresponding locations received just prior to cessation of movement at the parking spot. The arrival images may be selected such they are images of the surface that will be located beneath the vehicle 100 while parked. For example, where the vehicle has a length L, the arrival images may be selected as the images having corresponding locations within lengths L+B+A and L+B−A from the location of the vehicle 100 when parked. B may be a correction factor that is determined experimentally or mathematically by measuring or determining the distance from the location of the vehicle when parked at which the camera 108 will have the parking spot in its field of view. The value of A may be selected such that there is a tolerance or range of distances for which images will be stored 308 as arrival images. For example, an image stabilization process may be performed such that multiple arrival images are needed. Alternatively, the arrival images may be fixed number of N images having locations centered on L+B, having a last image with a location closest to L+B or a first image closest to L+B relative to the locations of other images from steps 302 and 304.

The method 300 may include detecting 310 departure of the vehicle. This may include detecting starting of the vehicle and commencement of movement of the vehicle. The method 300 may then include selecting 312 a departure image. The departure image may be selected as having a corresponding location approximately the same as the arrival image, e.g. within 15 cm, preferably within 5 cm, more preferably within 1 cm. As noted above, arrival images may be selected for a location or range of locations. Accordingly, one or more departure images may be selected 312 from a stream of images from the camera 108 having corresponding locations that are closest to the location or range of locations for the arrival images as compared to the locations of other departure images. The manner in which images are captured and tagged with locations following departure may be as described above with respect to steps 302 and 304.

Using the stored one or more arrival images from step 308 and the departure images of step 312, the method 300 may include performing 314 leak detection. Performing 314 leak detection may include executing the method 400 of FIG. 4.

Figure 4:
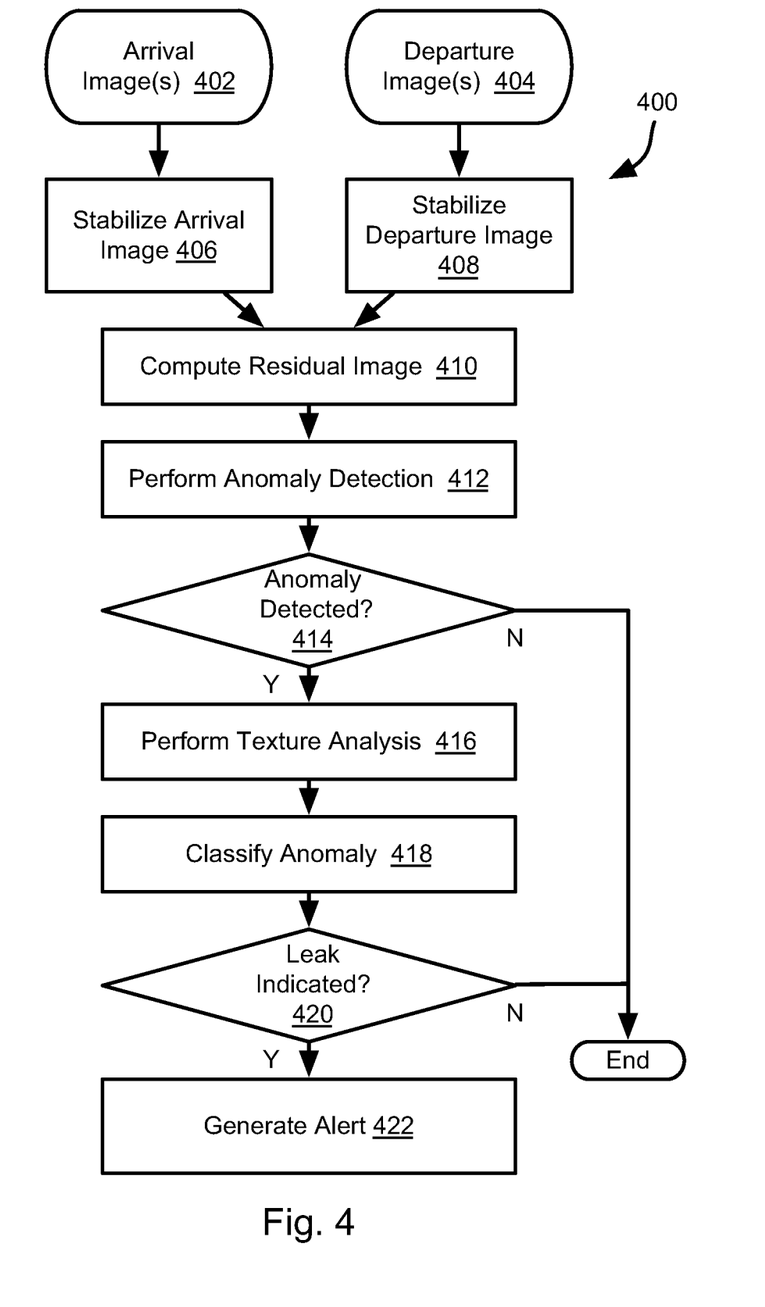
FIG. 4 is a process flow diagram of a method for detecting leaks in accordance with an embodiment of the present invention.

The method 400 takes as inputs the arrival images 402 and departure images 404 and performs image stabilization 406, 408 with respect to each image. In some embodiments, image stabilization is performed by the camera 108. In other embodiments, a series of stored arrival images 402 and departure images 404 are processed by the controller 102 in order to perform 406, 408 image stabilization. Steps 406, 408 may include any image stabilization technique known in the art.

The method 400 then computes 410 a residual image. This may include subtracting the stabilized arrival image from the stabilized departure image. The departure image and arrival image will not be taken from the exact same position. Accordingly, prior to subtraction, the stabilized arrival image and stabilized departure image may be translated relative to one another to compensate for this movement. The manner in which the arrival images and departure images are translated relative to one another may include performing image correlation or any other image analysis technique for determining movement between a pair of images.

Figure 5A:
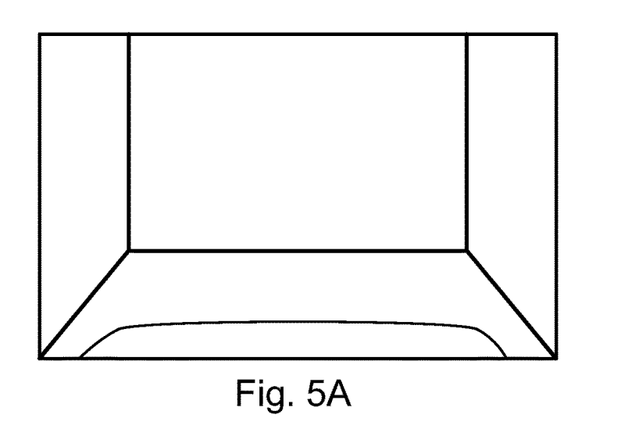
FIGS. 5A to 5C illustrate image processing for leak detection in accordance with an embodiment of the present invention.
Figure 5B:
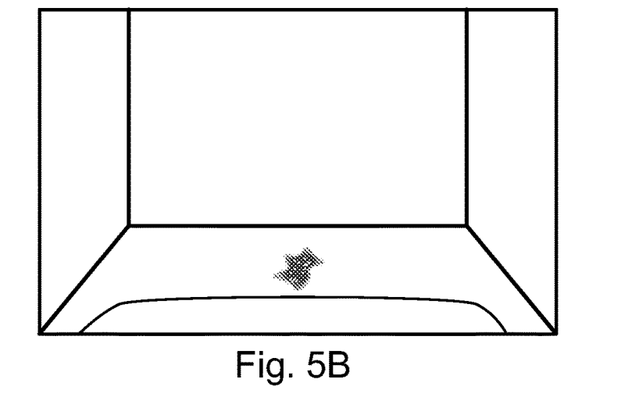
Figure 5C:
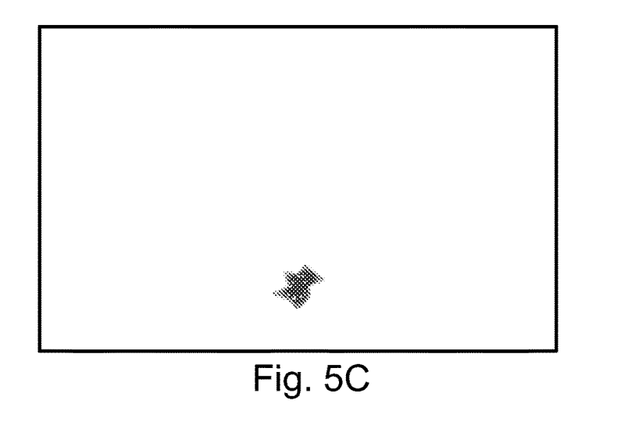

The method 400 may then include performing 412 anomaly detection with respect to the residual image. For example, referring to FIGS. 5A to 5C. A representation of a stabilized arrival image is shown in FIG. 5A and a representation of a stabilized departure image is shown in FIG. 5B. The residual image based on these images is shown in FIG. 5C. As is apparent in FIG. 5C, a fluid stain is present that may indicate a fluid leak. The manner in which the residual image is analyzed to identify differences may include any image processing computational techniques known in the art. In some embodiments, the residual image may be processed by a machine learning algorithm trained to identify fluid leaks.

If an anomaly is found 414 to be present, the method 400 may include performing 416 texture analysis and attempting to classify 418 the anomaly. Texture analysis may include identifying attributes such as color, reflectivity, and density of the anomaly. The attributes may then be used to classify 418 the anomaly. For example, a library of automotive fluids may be accessed by the controller that lists values or ranges of possible values for these attributes. Where the values for attributes identified by the texture analysis match those of an automotive fluid, that fluid may be determined to constitute the anomaly.

In some embodiments, the machine learning algorithm may be trained to identify fluid leaks by receiving training sets of arrival and departure images and an indicator of whether a fluid leak is present as a desired output. In such embodiments, step 410 may be omitted and the stabilized arrival and departure images may be input to the machine learning algorithm, which will then output a classification of any anomaly detected as being a particular automotive fluid or not. In such embodiments, steps 414-418 may be performed by the machine learning algorithm rather than as separate steps.

Where the classification is found 420 to be an automotive fluid, an alert may be generated 422. The alert may include illuminating a "check engine" light, displaying a textual message on a screen of an in-vehicle infotainment system, transmitting a message to a mobile phone of a driver, or other type of alert. The alert may include the classification of the type of fluid from step 418. The alert may indicate an amount of the fluid, such as determined from an area of the anomaly detected at step 414. Using the area of the anomaly and a viscosity of the detected fluid, the volume of leaked fluid may be determined. Using the elapsed time between arrival and departure and the volume, a rate of leakage may be determined. Using a known volume of the fluid in the vehicle, such as the volume of a reservoir holding the fluid or the manufacturer's recommendation for the volume of the fluid, the time until the fluid will be gone or reach a critical level may be determined from the leakage rate. The time until the level of the fluid is critical may be included in the alert.

Figure 6:
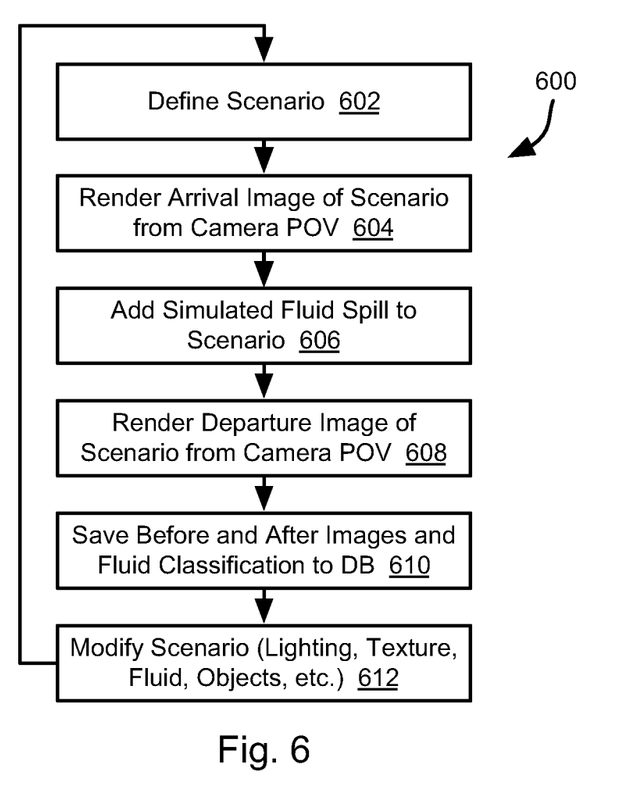
FIG. 6 is a process flow diagram of a method for generating training data for automatic leak detection using a three-dimensional model in accordance with an embodiment of the present invention.

Referring to FIG. 6, the illustrated method 600 may be used to train a machine learning model capable of identifying fluid leaks from arrival and departure images. The method 600 may be executed by a computer system, such as a computer system having some or all of the attributes of the computer system 200 of FIG. 2.

The method 600 may include defining 602 a scenario that is a three dimensional model of a parking scenario including a parking surface, a position and possibly velocity of the parking vehicle, and a point of view to the model corresponding to a location of a camera mounted to the parking vehicle.

Figure 7A:
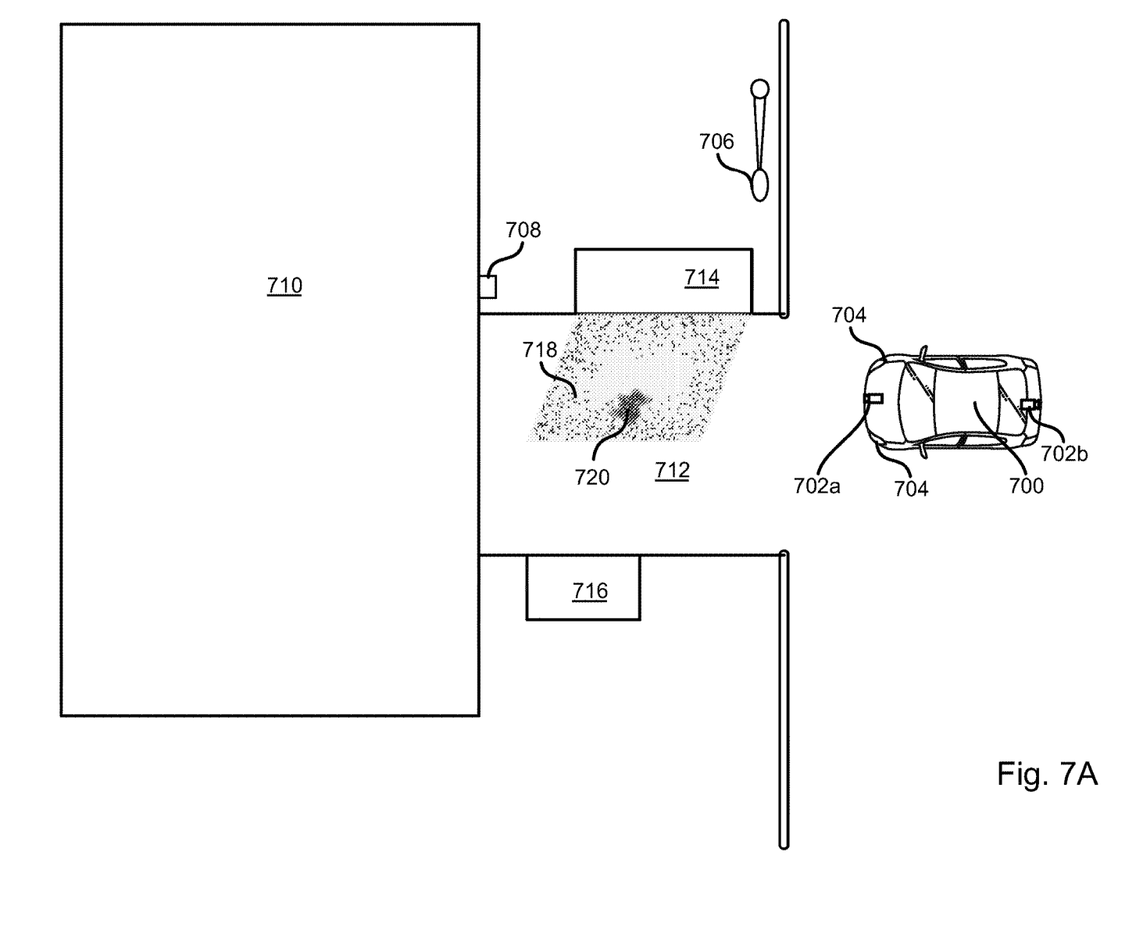
FIGS. 7A and 7B are illustrations of an example scenario that may be rendered in order to generate training data in accordance with an embodiment of the present invention.

FIG. 7A illustrates an example scenario. In this example, a vehicle model 700 is positioned in the model as shown. The vehicle model 700 may be part of the model or may be eliminated. In particular, the vehicle 700 defines a location of one or more cameras 702a-702b and possibly one or more light sources 704, e.g. headlights or tail lights. Accordingly, the locations of the cameras 702a-702b and possibly the light sources 704 may be defined according to their position on a vehicle model 700 but the remainder of the vehicle model 700 is ignored as not relevant to the perception of a parking spot.

The model may include one or more simulated light sources in addition to headlights 704, such as sunlight, moonlight, street lighting 706, or lights 708 mounted to a structure 710 containing or being adjacent to a parking spot 712.

The model may further include one or more objects 714, 716, such as bushes, trees, other vehicles, buildings, etc. Shadows 718 from such objects onto the parking spot 712 may be simulated.

The model is defined in two configurations, a first configuration with a simulated fluid spill 720 in the parking spot 712 and a second configuration without the fluid spill 720. The simulated fluid spill 720 may include a model that defines such properties as color, reflectivity, texture, viscosity, or other properties of a fluid. Simulated fluid spills 720 may be generated for various fluids, i.e. each simulated fluid spill 700 may include properties of a particular fluid, e.g. motor oil, transmission fluid, radiator coolant, power steering fluid, etc. In some embodiments, fluid spills 720 may include models of non-vehicle fluids (water, soft drink, etc.) to enable training of a machine learning model to distinguish between vehicle and non-vehicle fluids.

Referring again to FIG. 6, the method 600 may include rendering 604 an image of the scenario from the point of view of the camera 702a (or the camera 702b where reverse entry is assumed) in order to generate a simulated arrival image.

Figure 7B:
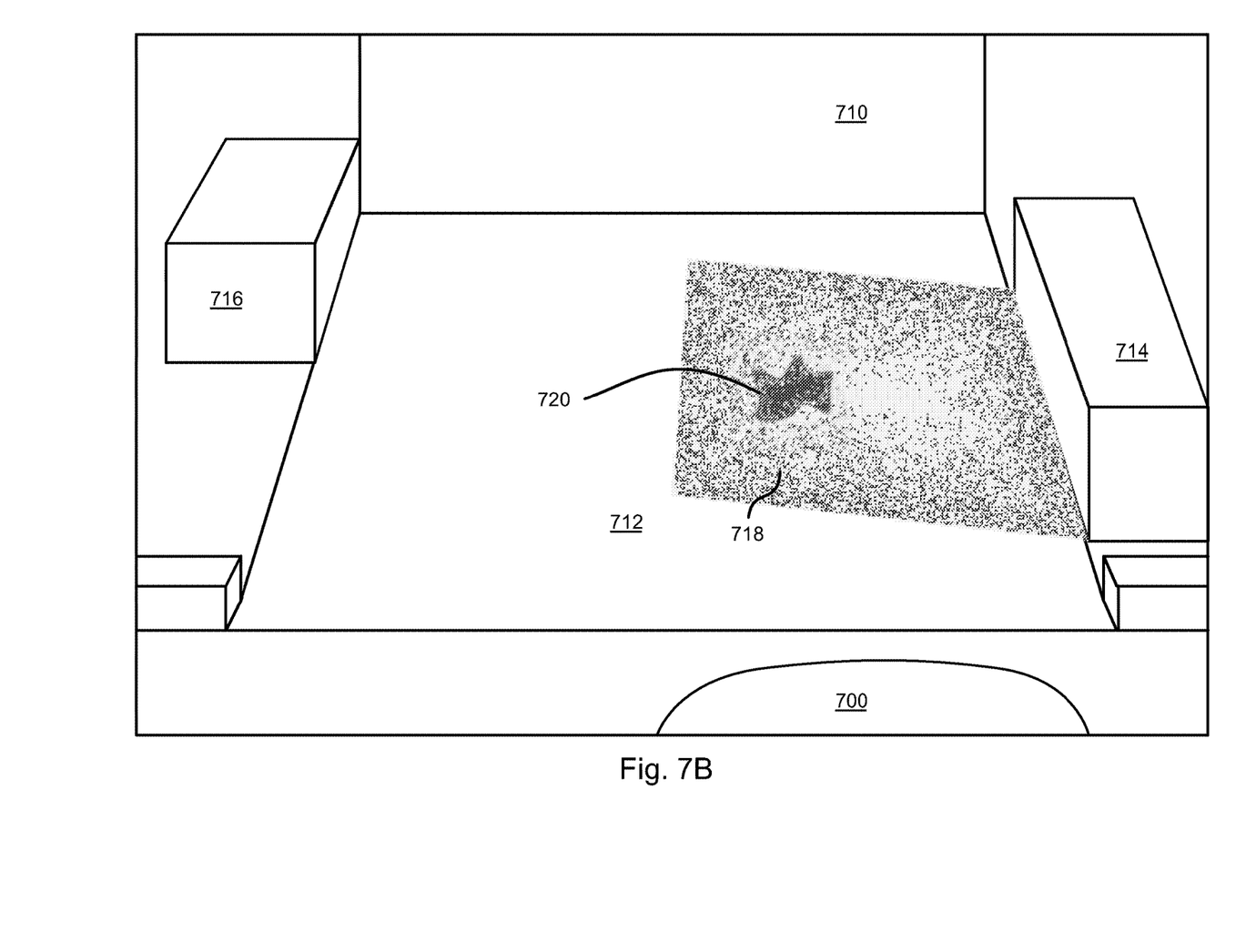

The method 600 may include adding 606 the simulated fluid spill 720 to the scenario and rendering 608 the modified scenario from the point of view of the camera 702a to obtain the departure image. FIG. 7B illustrates an example rendering of the departure image for the scenario of FIG. 7A. The rendering of the arrival image would be generated in a similar manner but lack a rendering of the fluid spill 720.

In some embodiments, the modified scenario used for the rendering of step 608 may include one or more additional modifications in addition to the fluid spill 720. For example, lighting may be changed to simulate a change in lighting between parking in the morning and departing at night, or vice versa. Likewise, debris may be added, vehicles may be added to or removed from adjacent the parking spot 712 or other changes may be made to the scenario to simulate possible changes that may occur between arrival and departure.

The manner in which the scenario is rendered at steps 604 and 608 may include any computer rendering technique known in the art of computer animation and computer generated images. Likewise, the scenario may be modeled using any computer animation technique known in the art. As known in the art, photorealistic renderings of computer models are possible. Accordingly, the resolution of the renderings 604, 608 and the detail of the scenario may be such that the simulated arrival and departure images are photorealistic, thereby enabling accurate training of a machine learning model.

The method 600 may further include saving 610 the arrival image from step 604, the departure image from step 608, and a classification of the fluid spill of step 606 in a database. In particular, the classification may simply indicate whether or not a fluid spill is present in the departure image. In some embodiments, step 606 will be omitted in some iterations of the method 600 in order to train the machine learning model to distinguish between cases when a fluid spill is present and when one is not.

In some embodiments, the classification may indicate whether a fluid spill 720 is a vehicle fluid or a non-vehicle fluid. In some embodiments, the classification may indicate what type of the vehicle fluid modeled by the fluid spill 720.

The method 600 may further include modifying 612 the scenario and repeating steps 602-610. Modifying the scenario may include modifying any of the features 706-718 of the scenario. For example, the texture of the parking spot 712 may be modified (concrete, asphalt, gravel, etc.) to enable the training of a machine learning model to recognize fluid spills 720 on various surfaces. Likewise, lighting may be modified to enable training of the machine learning model to recognize fluid spills 720 for various lighting conditions. Modification 612 may further include adding, removing, or modifying any surrounding structures of the scenario, such as models of adjacent vehicles.

The method 600 may be performed repeatedly, e.g. hundreds or even thousands of times or more, to build up a database of arrival and departure images with their corresponding classifications for training of a machine learning model.

Figure 8:
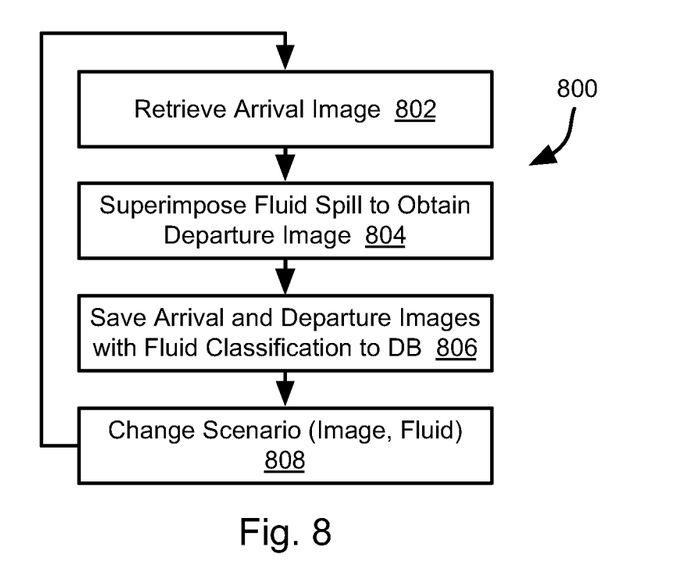
FIG. 8 is a process flow diagram of a method for generating training data from two-dimensional images in accordance with an embodiment of the present invention.

Referring to FIG. 8, in some embodiments, rather than defining a three-dimensional scenario, arrival and departure images for training purposes may be generated from two-dimensional images. The method 800 may be executed to generate training data and may be performed by a computer system having some or all of the attributes of the computer system 200 of FIG. 2.

The method 800 may include retrieving 802 an arrival image. The arrival image may be a rendering of a simulated scenario, such as described above with respect to FIG. 6. The arrival image may be an actual arrival image captured by the camera of a vehicle upon arrival near a parking location. For example, the arrival image may be an arrival image identified and stored according to the method 300 of FIG. 3.

The method 800 may further include superimposing 804 a rendering of a fluid spill onto an image corresponding to the arrival image of step 802. This may include rendering the fluid spill onto a parking spot visible in the arrival image of step 802. Alternatively, the departure image corresponding to the arrival image may be modified at step 804 to include a rendering of a fluid spill. For example, the departure image of step 804 may be identified and stored as part of the same iteration of the method 300 that generated the arrival image of step 802.

The method 800 may then include saving 806 the arrival image, departure image, and a classification in a database. As before, the classification may indicate whether or not a vehicle fluid spill is present in the departure image. As for the method 600, step 804 may be omitted in some iterations of the method 800. The classification may indicate whether the fluid spill superimposed at step 804 is a vehicle fluid and may further indicate a type of vehicle fluid. Accordingly, superimposing 804 the rendering of a fluid spill at step 804 may simulate properties of the vehicle or non-vehicle fluid and the classification may indicate what fluid was simulated. The simulated properties may include, color, reflectivity, texture, or any other visible property of a fluid.

The method 800 may include changing 808 the scenario, such as by selecting a different fluid to render at step 804 or by selecting a different arrival and/or departure image. The method 800 may be performed repeatedly, e.g. hundreds even thousands of times or more, to build up a database of arrival and departure images with their corresponding classifications for training of a machine learning model.

Figure 9:
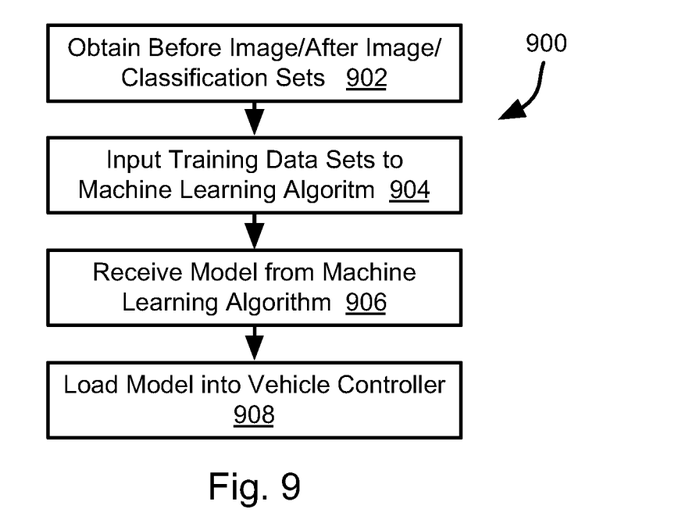
FIG. 9 is a process flow diagram of a method for training a machine learning model using the training data in accordance with an embodiment of the present invention.

Referring to FIG. 9, a machine learning model may be trained using sets of training data, where each set includes an arrival image, a departure image, and a classification (e.g., fluid spill is/is not present, vehicle/non-vehicle fluid, vehicle fluid type). The training data sets may be obtained 902 according to some or all of the method 600 of FIG. 6, the method 800 of FIG. 8, or by capturing actual arrival and departure images of a parking spot using a camera of a vehicle and providing a human specified classification of the departure image, such as based on intentional or known spilling of vehicle fluid prior to capturing the departure image or a known lack of spilling of vehicle fluid prior to capturing the departure image. In this case, the arrival and departure images may be identified according to the method 300 of FIG. 3.

The method 900 may include inputting 904 the training data sets into a machine learning algorithm, such as a deep neural network, however other types of machine learning algorithms may be used, such as a decision tree, clustering, Bayesian network, genetic, or other type of machine learning algorithm. The inputs to the machine learning algorithm are the arrival and departure images and the desired output for each training data set is the classification.

The method 900 may further include receiving 906 a model as trained by the machine learning algorithm of step 904 and loading 908 the model into a controller of a vehicle. The vehicle may then use the model to classify departure and arrival images as described above with respect to FIGS. 3 and 4.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method comprising, by a computer system:
   generating a plurality of training data sets, each including an arrival image having a parking position in its field of view, a departure image corresponding the arrival image, and a classification of the departure image, a portion of the training data sets including departure images having simulated fluid spills; and
   training a machine learning model according to the training data sets to identify fluid leaks;
   wherein generating the plurality of training data sets comprises, for each training data set:
      defining a three-dimensional model of a parking scenario for the each training data set; and
      rendering the arrival image of the each training data set from the three-dimensional model from a point of view of a camera mounted to a vehicle in the parking scenario.

2. The method of claim 1, wherein generating the training data sets comprises, for each training data set of the portion of the training data sets:

adding a fluid spill model to the three dimensional model of the parking scenario for the each training data set to obtain a modified model; and render the departure image of the each training data set from the modified model from the point of view of the camera mounted to the vehicle in the parking scenario for the each training data.

3. The method of claim 2, wherein the fluid spill model defines a color and a reflectivity; and wherein rendering the departure image of the each training data set from the modified model comprises rendering the fluid spill model in the departure image according to the color and the reflectivity.

4. The method of claim 3, wherein the fluid spill model defines a texture;

wherein rendering the departure image of the each training data set from the modified model comprises rendering the fluid spill model in the departure image according to the color, the reflectivity, and the texture.

5. The method of claim 1, wherein training the machine learning model according to the training data sets to identify fluid leaks comprises training a deep neural network (DNN) according to the training data sets.

6. The method of claim 1, wherein the classification of the departure image of each training data set of the plurality of training data sets indicates at least one of whether a fluid leak is present in the departure image and a type of fluid leak present in the departure image.

7. The method of claim 1, further comprising loading the machine learning model into a memory coupled to the controller of a vehicle having a camera mounted thereto and operably coupled to the controller.

8. A method comprising, by a computer system:

generating a plurality of training data sets, each including an arrival image having a parking position in its field of view, a departure image corresponding the arrival image, and a classification of the departure image, a portion of the training data sets including departure images having simulated fluid spills; and training a machine learning model according to the training data sets to identify fluid leaks;

wherein generating the plurality of training data sets further comprises, for each training data set of the portion of the training data sets:

using an original image from a camera of a vehicle having the parking position in its field of view as the arrival image of the each training data set; and adding the simulated fluid spill to one of the original image and another image from the camera of the vehicle having the parking position in its field of view to obtain the departure image of the each training data set.

9. The method of claim 8, wherein the camera is a forward facing camera mounted to the vehicle.

10. A system comprising one or more processing devices and one or more memory devices coupled to the one or more processing devices, the one or more memory devices storing executable code effective to cause the one or more processors to:

generate a plurality of training data sets, each including an arrival image having a parking position in its field of view, a departure image corresponding the arrival image, and a classification of the departure image, a portion of the training data sets including departure images having simulated fluid spills; and train a machine learning model according to the training data sets to identify fluid leaks;

wherein the executable code is further effective to cause the one or more processing devices to generate the plurality of training data sets by, for each training data set:

define a three-dimensional model of a parking scenario for the each training data set; and render the arrival image of the each training data set from the three-dimensional model from a point of view of a camera mounted to a vehicle in the parking scenario.

11. The system of claim 10, wherein the executable code is further effective to cause the one or more processing devices to generate the plurality of training data sets by, for each training data set of the portion of the training data sets:

add a fluid spill model to the three dimensional model of the parking scenario for the each training data set to obtain a modified model; and render the departure image of the each training data set from the modified model from the point of view of the camera mounted to the vehicle in the parking scenario for the each training data.

12. The system of claim 11, wherein the fluid spill model defines a color and a reflectivity; and wherein the executable code is further effective to cause the one or more processing devices to render the departure image of the each training data set from the modified model by rendering the fluid spill model in the departure image according to the color and the reflectivity.

13. The system of claim 12, wherein the fluid spill model defines a texture;

wherein the executable code is further effective to cause the one or more processing devices to render the departure image of the each training data set from the modified model by rendering the fluid spill model in the departure image according to the color, the reflectivity, and the texture.

14. The system of claim 10, wherein the executable code is further effective to cause the one or more processing devices to render train the machine learning model according to the training data sets to identify fluid leaks by training a deep neural network (DNN) according to the training data sets.

15. The system of claim 10, wherein the classification of the departure image of each training data set of the plurality of training data sets indicates at least one of whether a fluid leak is present in the departure image and a type of fluid leak present in the departure image.

16. The system of claim 10, wherein the executable code is further effective to cause the one or more processing devices to load the machine learning model into a memory coupled to the controller of a vehicle having a camera mounted thereto and operably coupled to the controller.

17. A system comprising one or more processing devices and one or more memory devices coupled to the one or more processing devices, the one or more memory devices storing executable code effective to cause the one or more processors to:

generate a plurality of training data sets, each including an arrival image having a parking position in its field of view, a departure image corresponding the arrival image, and a classification of the departure image, a portion of the training data sets including departure images having simulated fluid spills; and train a machine learning model according to the training data sets to identify fluid leaks;

wherein the executable code is further effective to cause the one or more processing devices to generate the plurality of training data sets by, for each training data set of the portion of the training data sets:
using an original image from a camera of a vehicle having the parking position in its field of view as the arrival image of the each training data set; and
adding the simulated fluid spill to one of the original image and another image from the camera of the vehicle having the parking position in its field of view to obtain the departure image of the each training data set.

18. The system of claim 17, wherein the camera is a forward facing camera mounted to the vehicle.

* * * * *